S. H. BROOKS.
GAUGE HOLE COVER.
APPLICATION FILED JUNE 28, 1920.
1,403,735. Patented Jan. 17, 1922.
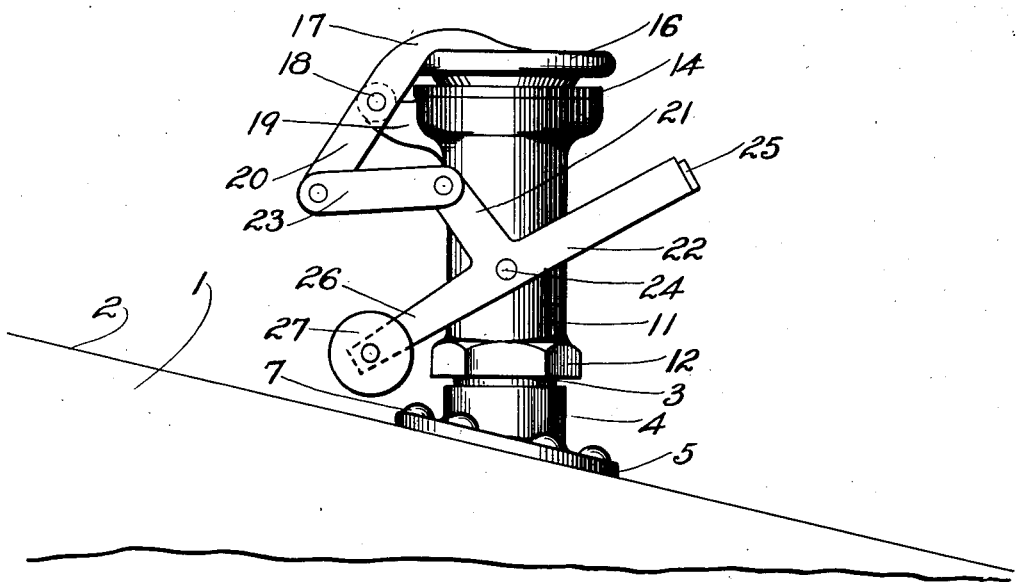
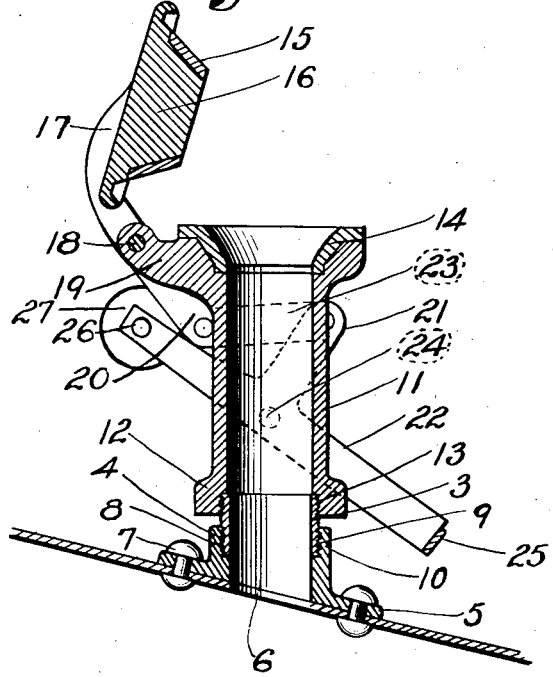
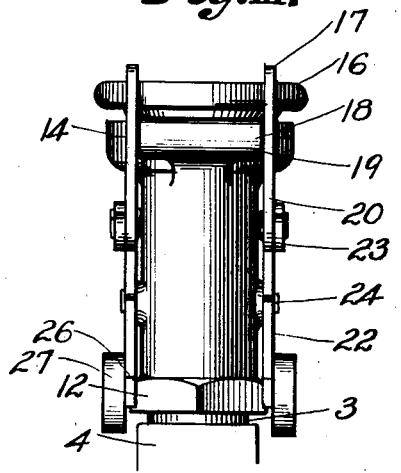
INVENTOR
Stephen H. Brooks.
BY
ATTORNEY

UNITED STATES PATENT OFFICE.

STEPHEN H. BROOKS, OF CLEVELAND, OHIO, ASSIGNOR TO OIL CONSERVATION ENGINEERING COMPANY, OF CLEVELAND, OHIO, A CORPORATION OF OHIO.

GAUGE-HOLE COVER.

1,403,735.   Specification of Letters Patent.   Patented Jan. 17, 1922.

Application filed June 28, 1920. Serial No. 392,186.

*To all whom it may concern:*

Be it known that I, STEPHEN H. BROOKS, a citizen of the United States, residing at Cleveland, in the county of Cuyahoga and State of Ohio, have invented certain new and useful Improvements in Gauge-Hole Covers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to oil storage tanks, and particularly to a self closing gauge hole cover which will automatically seat itself to maintain the gauge hole normally closed and thereby eliminate the liability of escaping gases being accidentally ignited and communicating a flame to the body of oil within the tank.

Storage tanks for oil are provided with gauge holes which consist of upstanding pipes or nipples through which the gauger may insert a gauge to determine the oil level within the tank. These gauge holes are oftentimes left uncovered and as a result, the gaseous hydrocarbons within the tank may escape therethrough, and as these are highly volatile and inflammable, there is great danger of the escaping gases becoming accidentally ignited and, by permitting the flame to communicate to the interior of the tank, ignite the contents thereof.

My invention contemplates the provision of means whereby the accidental ignition of the gaseous vapors escaping from the tank will be avoided and to this end I have provided a self-closing gauge hole cover, which will seat itself automatically so as to insure the normal closing of the gauge hole, the cover being so constructed, however, that it may be readily unseated when the gauger desires to determine the level of the oil within the tank.

In the drawings,

Fig. I is a side elevation of a gauge hole cover embodying my invention, illustrating its mounting on a tank roof.

Fig. II is a vertical, longitudinal, sectional view through the tank roof and the nipples surrounding the gauge hole, the self-seating cover being shown in vertical section, and Fig. III is an elevational view of the cover at right angles to Fig. I.

The tank 1 is shown as having an inclined roof 2, to which is secured a tubular member or nipple 3 through the medium of a tubular flange connection 4, having a base flange 5 surrounding the opening 6 in the roof 2 and fastened thereto by suitable fastening devices as, for example, rivets 7. The tubular upstanding portion 8 of the flange member 4 is internally threaded, as at 9, to engage in the external threads 10 of the nipple 3, which constitutes the port through which the gauge may be introduced into the tank. At the upper end of the nipple 3 is a flared, tubular member 11, preferably consisting of hard bronze and having a threaded skirt 12 engaging the externally threaded portion 13 of the nipple 3. The upper end of the tubular member 11 is provided with a cover or valve seat 14 to receive the conical portion 15 of the cover 16, the conical portion extending within the tubular seat portion 14. In actual practice both the seat 14 and the conical portion 15 may be faced with soft metal if desired to prevent leakage as will be well understood.

Projecting from the top of the cover 16 and extending beyond the perimeter thereof is a pair of curved supporting arms 17, pivoted at 18, to supporting brackets 19 rigid on the tubular member 11. The projecting ends 20 of the curved arms 17 are connected to the upstanding arms 21 of the pedal levers 22 by links 23. The pedal levers are secured to opposite sides of the tubular member 11 by pivot 24 and the forward end of the pedal levers are connected by a pedal bar 25 so that the operator may press his foot upon the pedal bar 25 and by pushing down thereon, swing the arms 21 forwardly and, through the links 23, swing the ends 20 of the arms 17 forwardly, swinging the arms 17 about their pivots 18 to lift the cover from its seat.

The rearwardly projecting ends 26 of the pedal levers 22 may be provided with counter-balance weights 27 so that when the operator removes his foot from the pedal 25, the weights will be effective in swinging the cover 16 back into seating position, as shown in Fig. I.

It will be apparent that the cover will normally rest upon its seat and that it can be unseated for the purpose of introducing a gauge through the gauge hole 6, but after the gauge is removed and the operator removes his foot from the pedal bar 25, the cover will automatically swing back into seating position.

What I claim and desire to secure by Letters-Patent is:

A gauge hole cover comprising a port member, a plug valve seat on the port member, a plug valve co-operative with the seat, a pivoted lever having an axis on the port member spaced from the valve seat, one arm of the lever connected to the valve to open and close the valve in an arc greater than that of the valve seat, a pivoted operating lever, having a pedal arm, a weight arm and a link arm, and a link connecting the link arm with the valve lever whereby the valve is opened by pressure on said pedal arm and closed by the weight when the pressure is removed.

In testimony whereof I affix my signature.

STEPHEN H. BROOKS.